No. 643,129. Patented Feb. 13, 1900.
A. W. HECHT.
REFRACTING ATTACHMENT FOR BICYCLE LAMPS.
(Application filed Apr. 7, 1898.)
(No Model.) 2 Sheets—Sheet 1.
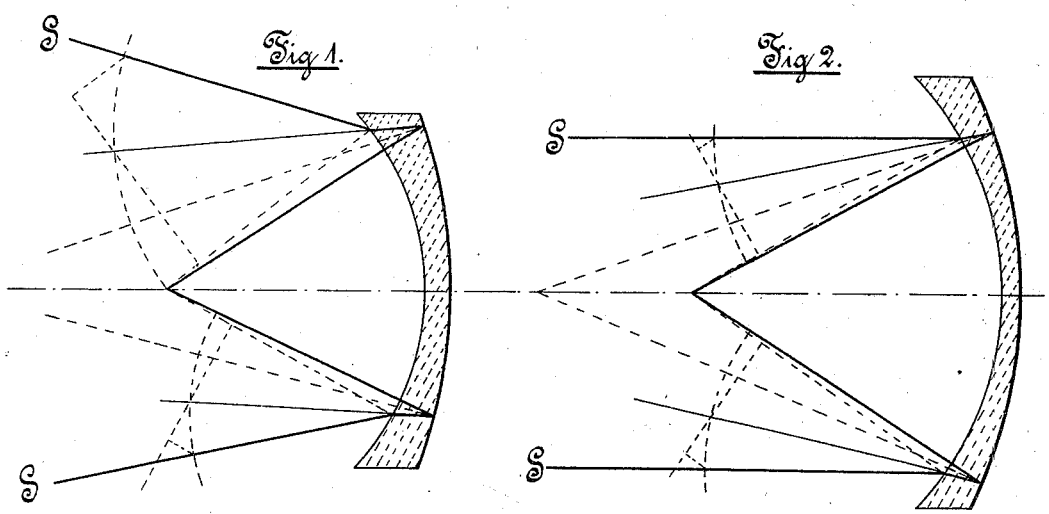
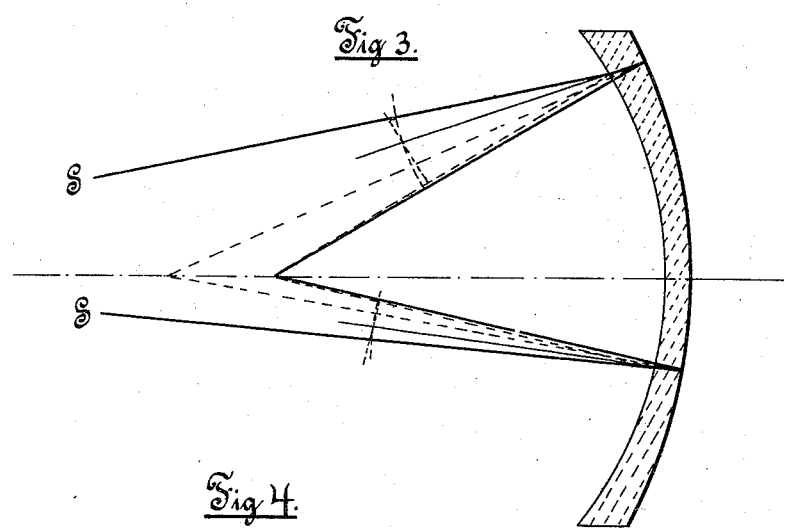
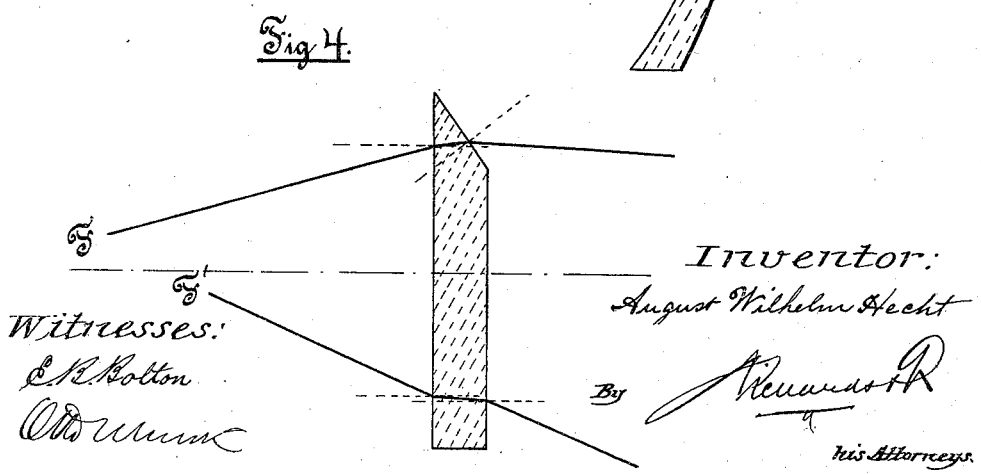
Witnesses:
Inventor:
August Wilhelm Hecht
By
his Attorneys.

No. 643,129. Patented Feb. 13, 1900.
A. W. HECHT.
REFRACTING ATTACHMENT FOR BICYCLE LAMPS.
(Application filed Apr. 7, 1898.)
(No Model.) 2 Sheets—Sheet 2.
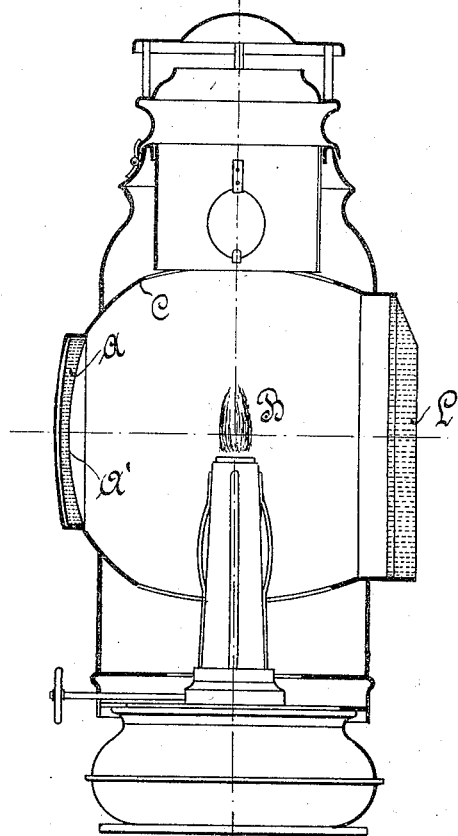
Fig. 5.
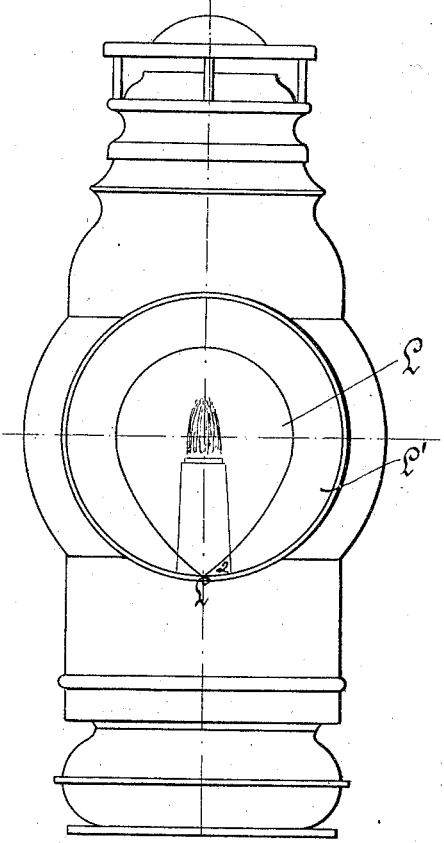
Fig. 6.
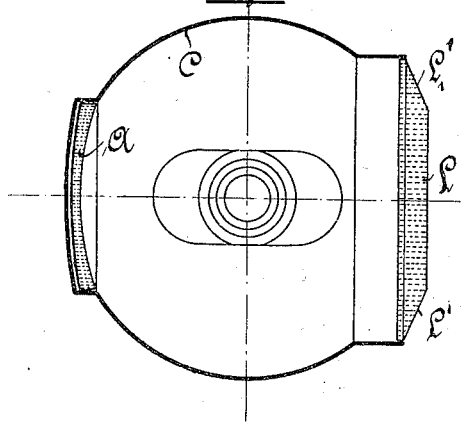
Fig. 7.
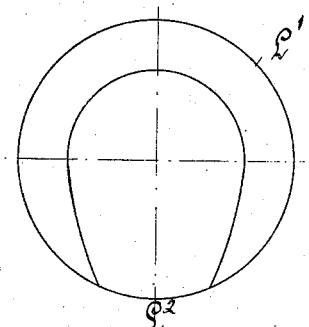
Fig. 8.
Witnesses:
Inventor:
August Wilhelm Hecht
By
his Attorneys.
THE NORRIS PETERS CO., PHOTO-LITHO., WASHINGTON, D. C.

United States Patent Office.

AUGUST WILHELM HECHT, OF NUREMBERG, GERMANY, ASSIGNOR TO EDUARD GRUMME, OF SAME PLACE.

REFRACTING ATTACHMENT FOR BICYCLE-LAMPS.

SPECIFICATION forming part of Letters Patent No. 643,129, dated February 13, 1900.

Application filed April 7, 1898. Serial No. 676,784. (No model.)

*To all whom it may concern:*

Be it known that I, AUGUST WILHELM HECHT, a subject of the King of Bavaria, and a resident of Nuremberg, in the Kingdom of Bavaria and Empire of Germany, have invented certain new and useful Improvements in Reflectors, of which the following is a specification.

In order to reflect in certain directions the rays proceeding from a source of light, concave mirrors of suitable form arranged behind the said source of light are usually employed. If, for instance, as in the ordinary projectors, the rays of light are to be reflected approximately parallel to the optical axis, the reflecting-surface must be formed as a paraboloid, while if the reflected rays are to diverge a hyperboloidic concave mirror must be used. The manufacture of such concave mirrors offers, as is well known, many difficulties not yet overcome, more particularly as regards the hyperboloidic glass surface.

This invention has for its object to obtain the same action—that is to say, the reflection of the rays of light in suitable directions by means of a reflector, which can be easily made by the usual appliances employed in the manufacture of optical glasses.

It has been found that a periscopic lens arranged behind the source of light and coated on its rear side—that is to say, the one turned away from the light—with a reflecting substance fulfils this object. Such a reflector acts as a lens on the side turned toward the light—that is to say, the rays of light falling on the inner (concave) surface are generally, in accordance with the known law, refracted and fall on the coated (convex) surface, which acts as a mirror, which reflects the rays thus diverted, the rays which strike the lens at right angles passing, of course, through it unrefracted. By a suitable selection of the radii of the concave and convex sides of the lens, as well as of the relative position of the reflector to the source of light, it is possible, as may easily be seen, to reflect the rays of light reaching the reflector from the source of light at a suitable angle—that is to say, at an acute angle to the optical axis or parallel to the same.

In the accompanying drawings, Figures 1, 2, and 3 are diagrammatic representations of the three cases here coming in question as an example. Fig. 4 is a diagrammatic view of a front glass designed for use in connection with the improved reflector. Fig. 5 is a vertical sectional view of a lantern embodying the reflector and front glass or lens. Fig. 6 is a front elevation of the same. Fig. 7 is a horizontal section. Fig. 8 is an elevational view of the front glass or lens.

In Fig. 1 the proportion of the radii is about twenty to ten, and the reflected rays S consequently diverge. In Fig. 2 the proportion is about twenty to thirteen, whereby parallel reflected rays are produced, while in Fig. 3, with a proportion of radii of about twenty to fifteen, a case is shown where the reflected rays converge. It is thus possible by means of a periscopic reflector to distribute the rays of light from a flame, if desired, over a large surface lying in front or to direct them in a parallel direction to a far-distant point and converging to concentrate them on a point close at hand, and there results from this an applicability extending over the widest limits of the reflector for the cases arising in practice.

Figs. 5 to 7 of the drawings show as an example the application of this improved reflector to cycle-lamps, in which it is a question of illuminating as intensely as possible the surface of the ground immediately in front of the wheel. This object is of course naturally and most completely attained with diverging rays, and consequently a periscopic reflector A, having a concave inner and convex outer surface, is arranged behind the burner of the lamp, or rather the illuminating-frame B, in such a way that the latter is situated approximately in the geometrical center of the concave surface A'. The rays are therefore reflected divergently in the manner shown in Fig. 1. In order, however, as far as possible to avoid any loss of intensity in the light by rays radiated and reflected in other than the desired directions, a further arrangement is adopted by which the part C of the lamp-casing bordering on the lens A forms a hollow mirror, which is so formed and arranged relative to the lighting-flame that the rays proceeding from the latter fall at right angles and are therefore thrown back toward the flame itself, and thus these rays, which would otherwise be partially lost, assist in strengthening the source of light, owing to their being reconveyed to it—that is to say, they increase the power of the light.

In order to be able to illuminate the atmosphere to a great distance in front of the vehicle in cases where (as with bicycle-lanterns) it is mainly a question of illuminating the ground lying in front of the wheel, and without deleteriously affecting the illuminating of the ground, the following arrangement, which is shown more particularly in Figs. 4, 6, and 8 of the accompanying drawings, may be adopted in combination with a periscopic reflector: The front glass L, lying in front of the source of light, is faceted in the manner shown in Figs. 6 and 8—that is to say, is provided at the top and side edges with a beveled part L', which does not extend to the deepest part—that is to say, the lower edge L². This may be attained either by giving to the beveled edge a horseshoe shape, as shown in Fig. 8, or a heart shape, as shown in Fig. 6. By this beveling the diverging rays F, Fig. 4, falling thereon will, in accordance with the well-known law of refraction, be diverted in an inward direction, while the rays F', directed downward, will pass through parallel to the usual direction of the fall. Consequently the rays serving for ground illumination—that is to say, the downwardly-directed ones—preserve their divergence produced by the reflector, while the rays passing out through the side and upper edges are somewhat drawn together, and thereby the air lying in front of them is illuminated to a greater distance than would otherwise be the case.

Having now particularly described and ascertained the nature of my said invention and in what manner the same is to be performed, I declare that what I claim is—

In lamps such as hereinbefore described, the combination with the source of light of a glass L having faceted or beveled edges except at the lower edge or the deepest point through which beveled edges the diverging rays of light directed to the sides and upward are diverted inwardly, while the rays which fall downward pass through in the original direction and parallel thereto, substantially as hereinbefore described.

In witness whereof I have hereunto set my hand in presence of two witnesses.

AUGUST WILHELM HECHT.

Witnesses:
   LORENZ PÜRNER,
   ANDREAS STEIN.